(12) United States Patent
Petrovický et al.

(10) Patent No.: US 8,739,125 B2
(45) Date of Patent: May 27, 2014

(54) AUTOMATED AND UNATTENDED PROCESS FOR TESTING SOFTWARE APPLICATIONS

(75) Inventors: Lukáš Petrovický, Most (CZ); Pavel Macík, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 1065 days.

(21) Appl. No.: 12/485,527

(22) Filed: Jun. 16, 2009

(65) Prior Publication Data

US 2010/0318969 A1    Dec. 16, 2010

(51) Int. Cl.
*G06F 9/44* (2006.01)
*G06F 11/36* (2006.01)

(52) U.S. Cl.
CPC ........ *G06F 11/3672* (2013.01); *G06F 11/3696* (2013.01)
USPC ............................ 717/124; 717/126; 717/127

(58) Field of Classification Search
CPC ............ G06F 11/3688; G06F 11/3672; G06F 11/3696
USPC .......................... 717/101–178; 709/201–253; 714/1–824; 705/1.1, 7.22; 706/45, 919; 702/108, 123; 718/100; 370/254
See application file for complete search history.

(56) References Cited

U.S. PATENT DOCUMENTS

| | | | | |
|---|---|---|---|---|
| 5,629,878 | A * | 5/1997 | Kobrosly | 702/120 |
| 5,909,544 | A * | 6/1999 | Anderson et al. | 709/208 |
| 6,581,075 | B1 | 6/2003 | Guturu et al. | |
| 6,662,217 | B1 * | 12/2003 | Godfrey et al. | 709/219 |
| 6,697,961 | B1 * | 2/2004 | Petrenko et al. | 714/26 |
| 6,698,012 | B1 * | 2/2004 | Kossatchev et al. | 717/126 |
| 6,766,477 | B2 * | 7/2004 | Grucci et al. | 714/38.1 |
| 6,898,784 | B1 * | 5/2005 | Kossatchev et al. | 717/126 |
| 6,959,433 | B1 * | 10/2005 | Morales et al. | 717/127 |
| 7,054,867 | B2 | 5/2006 | Bosley et al. | |
| 7,107,174 | B2 * | 9/2006 | McGrath et al. | 702/123 |
| 7,178,063 | B1 * | 2/2007 | Smith | 714/38.1 |
| 7,213,013 | B1 | 5/2007 | Subramaniam et al. | |
| 7,293,014 | B2 | 11/2007 | Subramaniam et al. | |
| 7,324,988 | B2 | 1/2008 | Altevogt et al. | |

(Continued)

OTHER PUBLICATIONS

Test Manager: A Regression Testing Tool—Lee J. White, Venkatasubramaniam Narayanswamy, Ted Friedman, Marc Kirschenbaum, Paul Piwowarski, Mitsuru Oha—Software Maintenance ,1993. CSM-93, Proceedings.*

(Continued)

*Primary Examiner* — Lewis A Bullock, Jr.
*Assistant Examiner* — Francisco Aponte
(74) *Attorney, Agent, or Firm* — Lowenstein Sandler LLP (57) ABSTRACT

In one embodiment, a mechanism for business process-managed testing of software applications is disclosed. In one embodiment, a method for business process-managed testing of software applications includes identifying, by a server computing device, all tools and services used to test a software application deployed on the server computing device, and determining, by the server computing device, an order of execution of the identified tools and services in testing the software application. The method further includes designing, by a business process management (BPM) service of the server computing device, a testing management process that integrates the identified tools and services in the determined order of execution for testing the software application in an automated and unattended manner, and deploying, by the server computing device, the testing management process to act as a controlling layer over the identified tools and services in the testing of the software application.

12 Claims, 5 Drawing Sheets

(56) References Cited

U.S. PATENT DOCUMENTS

| | | | |
|---|---|---|---|
| 7,370,101 B1* | 5/2008 | Lakkapragada et al. | 709/223 |
| 7,373,636 B2* | 5/2008 | Barry et al. | 717/124 |
| 7,415,635 B1* | 8/2008 | Annangi | 714/38.12 |
| 7,590,973 B1* | 9/2009 | Barry et al. | 717/126 |
| 7,607,119 B2* | 10/2009 | Chilimbi et al. | 717/101 |
| 7,669,083 B2* | 2/2010 | Arora et al. | 714/25 |
| 7,827,548 B1* | 11/2010 | Anderson et al. | 717/174 |
| 8,141,043 B2* | 3/2012 | Jones et al. | 717/124 |
| 2003/0084039 A1 | 5/2003 | Balogh | |
| 2004/0044993 A1* | 3/2004 | Muller et al. | 717/124 |
| 2004/0133880 A1* | 7/2004 | Paternostro et al. | 717/124 |
| 2004/0181511 A1 | 9/2004 | Xu et al. | |
| 2004/0205242 A1 | 10/2004 | Xu et al. | |
| 2005/0010560 A1 | 1/2005 | Altevogt et al. | |
| 2005/0027723 A1 | 2/2005 | Jones et al. | |
| 2005/0039036 A1 | 2/2005 | Eisen | |
| 2005/0050028 A1 | 3/2005 | Rose et al. | |
| 2005/0060243 A1* | 3/2005 | Whetman et al. | 705/28 |
| 2006/0174162 A1* | 8/2006 | Varadarajan et al. | 714/38 |
| 2006/0174222 A1* | 8/2006 | Thonse et al. | 717/106 |
| 2007/0050429 A1 | 3/2007 | Goldring et al. | |
| 2007/0067762 A1* | 3/2007 | Wadsworth et al. | 717/149 |
| 2007/0082741 A1* | 4/2007 | Xu | 463/43 |
| 2007/0100808 A1 | 5/2007 | Balogh | |
| 2007/0174069 A1* | 7/2007 | Moore et al. | 705/1 |
| 2007/0208697 A1 | 9/2007 | Subramaniam et al. | |
| 2007/0260575 A1 | 11/2007 | Robinson et al. | |
| 2007/0288552 A1* | 12/2007 | Snyder | 709/203 |
| 2008/0016499 A1* | 1/2008 | Jones et al. | 717/124 |
| 2008/0021908 A1 | 1/2008 | Trask et al. | |
| 2008/0052663 A1* | 2/2008 | Cope et al. | 717/101 |
| 2008/0127093 A1* | 5/2008 | Fernandez-lvern et al. | 717/124 |
| 2008/0209267 A1* | 8/2008 | Xu et al. | 714/25 |
| 2008/0222609 A1* | 9/2008 | Barry et al. | 717/124 |
| 2008/0235682 A1* | 9/2008 | Oren et al. | 718/100 |
| 2009/0007074 A1* | 1/2009 | Campion et al. | 717/124 |
| 2009/0106211 A1 | 4/2009 | Balogh | |
| 2009/0177610 A1 | 7/2009 | Kawamura et al. | |
| 2009/0199160 A1* | 8/2009 | Vaitheeswaran et al. | 717/124 |
| 2009/0254887 A1* | 10/2009 | Rossi et al. | 717/126 |
| 2009/0281865 A1* | 11/2009 | Stoitsev | 705/9 |
| 2010/0094877 A1 | 4/2010 | Garbe | |

OTHER PUBLICATIONS

Prioritizing Test Cases for Regression Testing—Gregg Rothermel, Member, IEEE Computer Society, Roland H. Untch, Member, IEEE Computer Society, Chengyun Chu, and Mary Jean Harrold, Member, IEEE Computer Society—IEEE Transactions on Software Engineering, vol. 27, No. 10, Oct. 2001.*

John Koenig, "JBOSS jBPM", White Paper, www.riseforth.com, 10 pages, Nov. 2004.

Martin Fowler, "Continuous Integration", Fowler.com, http://www.martinfowler.com/articles/continuousIntegration.html, 14 pages, Apr. 22, 2009.

Kohsuke Kawaguchi, "What is Hudson?", Meet Hudson, http://wiki.hudson-ci.org/display/HUDSON/Meet+Hudson, 2 pages, May 14, 2009.

USPTO, Notice of Allowance for U.S. Appl. No. 12/463,553 mailed Jun. 3, 2011.

USPTO, Notice of Allowance for U.S. Appl. No. 11/809,635 mailed Oct. 7, 2009.

USPTO, Notice of Allowance for U.S. Appl. No. 12/463,605 mailed Jun. 1, 2011.

USPTO, Notice of Allowance for U.S. Appl. No. 12/463,378 mailed Jun. 3, 2011.

Risson, John, et al., "Survey of research towards robust peer-to-peer networks: Search methods", Computer Networks, vol. 50, Issue 17, Dec. 5, 2006, pp. 3485-3521.

Kronfol, Amr Z., "FASD: A Fault-tolerant, Adaptive, Scalable, Distributed Search Engine", Princeton University, May 6, 2002, 58 pages.

Karger, David et al., "Consistent Hashing and Random Trees: Distributed Caching Protocols for Relieving Hot Spots on the World Wide Web", STOC '97, El Paso, TX, @ 1997, pp. 654-663.

Gnawali, Omprakash D., "A Keyword-Set Search System for Peer-to-Peer Networks", Massachusetts Institute of Technology, Jun. 2002, 65 pages.

Karasawa, Kei, "Personalized Serach using Identity-Bsed Hashing", DIM '08, Fairfax, VA, Oct. 31, 2008, pp. 71-79.

Ganesan, Prasanna, et al., "YAPPERS: A Peer-to-Peer Lookup Service over Arbitrary Topology", INFOCOM 2003, vol. 2, Mar. 30-Apr. 3, 2003, pp. 1250-1260.

Zhong, Ming, et al., "Correlation-Aware Object Placement for Multi-Object Operations", ICDCS '08, Beijing, China, Jun. 17-20, 2008, pp. 512-521.

* cited by examiner

AUTOMATED AND UNATTENDED PROCESS FOR TESTING SOFTWARE APPLICATIONS

TECHNICAL FIELD

The embodiments of the invention relate generally to application testing and, more specifically, relate to a mechanism for automated and unattended process for testing software applications.

BACKGROUND

In software development, a test suite is a collection of test cases that are intended to be used to test a software program to show that it has some specified set of behaviors. A test suite often contains detailed instructions or goals for each collection of test cases and information on the system configuration to be used during testing.

Presently, there are many tools that allow application testing to be run on remotes stations in an automated manner. For example, continuous integration (CI) tools allow for the frequent integration of multiple software developers' work to a single application—typically multiple integrations per day. Each integration of the software developers' work is verified by the CI tools, including testing, to detect integration errors as quickly as possible. However, existing application testing suite tools, such as CI tools, are not completely integrated in the respect that excessive human interaction is usually required for attending to the automated tests. For example, human interaction for failure investigation and problem solving is often times needed.

In addition, no tools exist for the automated and unattended management of application testing suites. Such automated and unattended management of application testing suites would include oversight of test suite execution, resource management, error recovery, and test results submission into external tracking systems, for example. Presently, each of these functions of test suite execution, resource management, error recover, and test result submission into external tracking systems is controlled by separate systems and requires significant human interaction to integrate the functions together. As such, a tool for automated and unattended management of application testing suites would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for a mechanism for automated and unattended process for testing software applications. In one embodiment, a method of automated and unattended testing of software applications includes identifying, by a server computing device, all tools and services used to test a software application deployed on the server computing device, and determining, by the server computing device, an order of execution of the identified tools and services in testing the software application. The method further includes designing, by a business process management (BPM) service of the server computing device, a testing management process that integrates the identified tools and services in the determined order of execution for testing the software application in an automated and unattended manner, and deploying, by the server computing device, the testing management process to act as a controlling layer over the identified tools and services in the testing of the software application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for implementing an automated and unattended process for testing software applications. Embodiments of the invention enable managed automated execution of test suites, result reporting, and a mechanism for automated error recovery, including optional human input. Using the process of embodiments of the invention, which is flexible to modify and extend, users are able to test any application they choose to in an automated and unattended fashion. Furthermore, embodiments of the invention reduce the time needed to attend to automated tests by fixing any failure problems of the testing suite automatically and running the test again without any human interaction.

Figure 1:
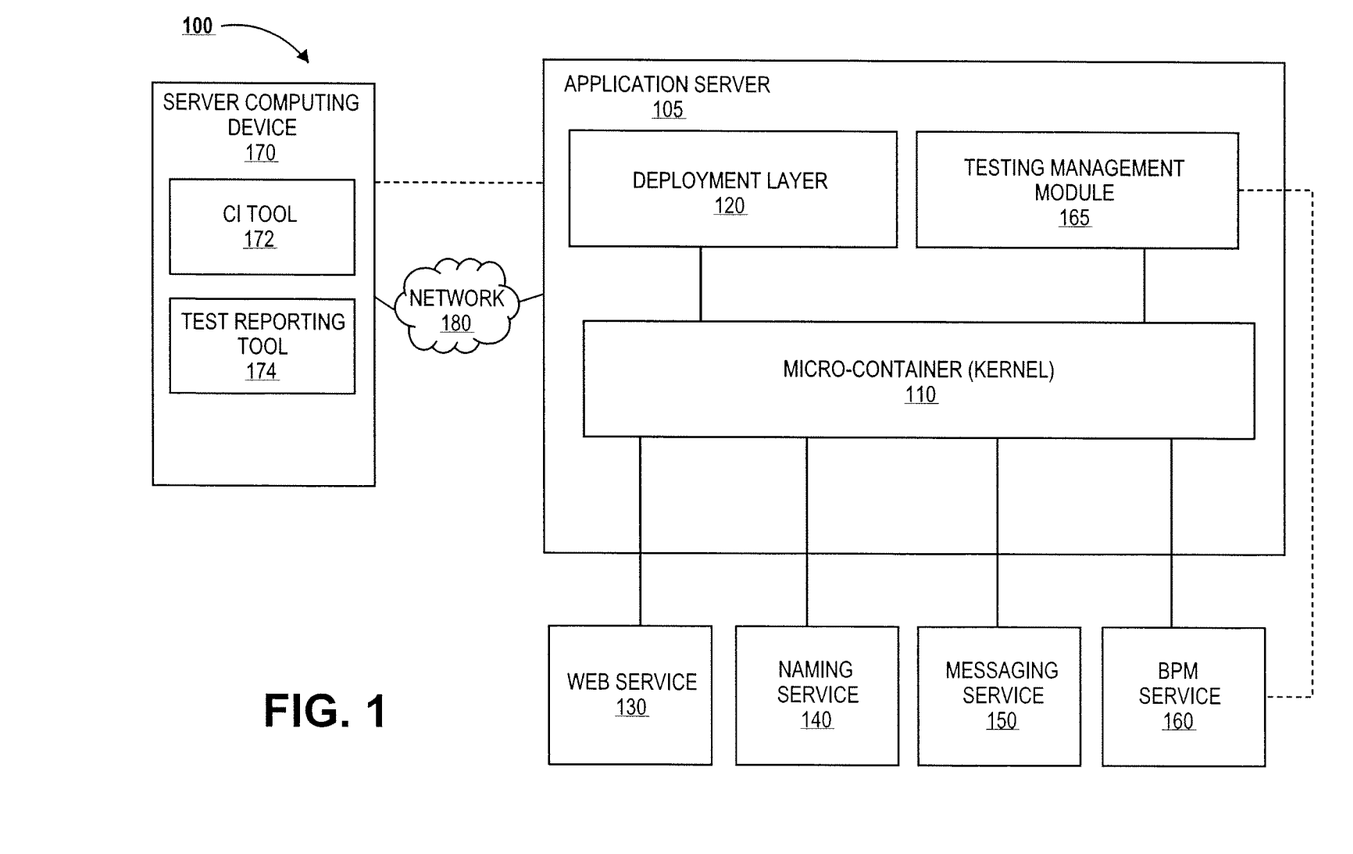
FIG. 1 is a block diagram of system that implements an automated and unattended process for testing software applications.

FIG. 1 is a block diagram of system 100 that implements an automated and unattended process for testing software applications. In one embodiment, system 100 includes application server 105, which is a computing device including at least a processor and a memory. In one embodiment, application server 105 includes a micro-container (MC) 110 as a kernel. MC 110 serves as an integration spine for various plug-in components. Application server 105 further includes a deployment layer 120 for deploying services and applications onto MC 110 for runtime operations.

In addition to deployment layer 120, various other components can also be plugged into MC 110, including, but not limited to, a Web service 130, a naming service 140, a messaging service 150, and a business process management (BPM) service 160. All of the plug-in components interact with MC 110. Although shown as part of application server 105, MC 110 may be used standalone outside of application server 105 and can be plugged into any server environment.

In some embodiments, application server 105 uses a BPM service 160 to provide a programmatic structure for designing transactions and executing them using automated decisions, tasks, and sequence flows. In one embodiment, BPM service 160 provides graphical user interface (GUI) tools to enhance any applications that are run on application server 105.

In one embodiment, BPM service 160 is utilized to define a testing management process for a complete test of an application deployed on application server 105. In one embodiment, testing management process is deployed as testing management module 165 on application server 105. In some embodiments, the testing management module 165 may be deployed on a server (not shown) separate from the application server 105 hosting the application to be tested.

The testing management process 165 of embodiments of the invention encompasses many different tasks associated with the testing of applications, including test suite execution, resource management, error recovery, and test results submission into an external tracking system, to name a few examples. The testing management process 165 is a controlling layer overseeing all of these tasks and ensuring that they run in a specific order. The testing management process 165 provides to each task any specific instructions, parameters, and resources required by the task in an automated and unattended manner.

In one embodiment, using the tools provided by BPM server 160, the testing management process 165 of embodiments of the invention may be defined, designed, and deployed by someone having little technical understanding of problems involved. For example, the GUI tools of BPM service 160 allow the development of the testing management process 165 to be presented in an abstract manner to the developer of the testing management process 165 of embodiments of the invention.

In one embodiment, the testing management process 165 defined by BPM service 160 acts as a controlling layer integrating a variety of tools and services used for the overall testing process of an application of application server 105. Such tools and service may include continuous integration (CI) tools, test reporting tools, graphical designing tools, and resource management tools. Programming code already exists in system 100 that controls the CI tools, that knows how to report results to a test management/result tool, that controls the graphical designing tools, and that controls resource management/allocation. However, this programming code for each of these tools and services is not inter-related and each tool and service operates as a separate entity and process in system 100.

Embodiments of the invention utilize the tools of BPM service 160 to automatically create the testing management process 165 in a manner that defines the order of execution of the programming code of the various tools and services used for testing applications. As a result, these processes are integrated into a single controlling testing management process 165. The testing management process 165 provides a set of rules for the various tools and services that dictates what happens and when it happens during the process. The process of embodiments of the invention provides the individual jobs performed by the tools and services for testing applications with various instructions, parameters, and resources defining the execution environment for these jobs.

For instance, in one embodiment, the testing management process 165 may control a continuous integration (CI) tool 172 used for testing of the applications deployed in deployment layer 120 of application server 105. In one embodiment, the CI tool 172 is a Hudson™ CI tool. The testing management process 165 may also control a test reporting tool 174. The test reporting tool 174 may be Testopia™. In one embodiment, the CI tool 172 and test reporting tool 174 may be located on another server computing device 170, which may be attached to application server 105 via a network 180 or via a direct connection 185. The testing management process 165 passes instructions, parameters, and resources for the CI tool 172 and the test reporting tool 174 in such a manner that will automate the operation of CI tool 172 and test reporting tool 174 so that human interaction will not be required to integrate these tools 172, 174 at run-time.

In one embodiment, BPM service 160 implements the testing management process 165 using JAVA Business Process Management (jBPM) tools or JBoss™ Rules. The process can be designed and overlooked visually by the tools that are provided in the JBoss™ Developer Studio (JBDS). In one embodiment, JBDS may be used as a set of plug-ins to a popular Integrated Development Environment called Eclipse™. Using Eclipse™ with embodiments of the invention, the testing management process 165 can be put designed, deployed (upload to application server 105), executed, and managed. However, some embodiments of the invention may utilize any other sort of visualization tool to create the automated and unattended process for testing applications.

Figure 2:
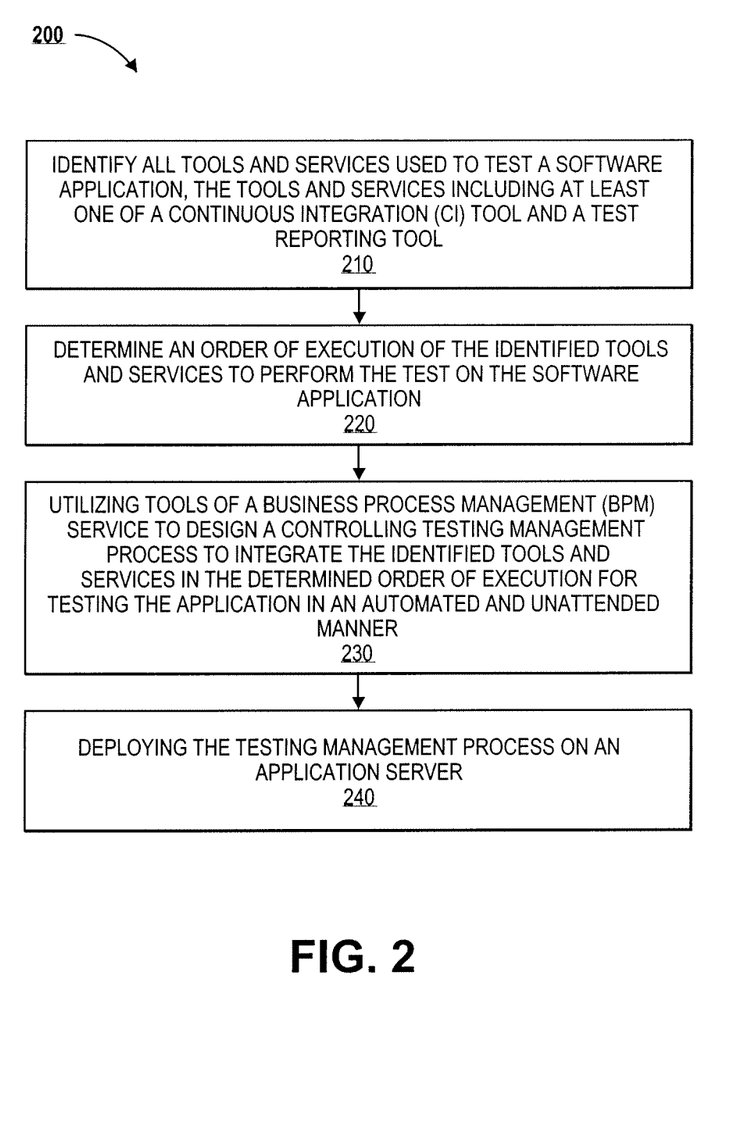
FIG. 2 is a flow diagram illustrating a method for automated and unattended testing management according to an embodiment of the invention.

FIG. 2 is a flow diagram illustrating a method 200 for automated and unattended testing management according to an embodiment of the invention. Method 200 may be performed by processing logic that may comprise hardware (e.g., circuitry, dedicated logic, programmable logic, microcode, etc.), software (such as instructions run on a processing device), or a combination thereof. Method 200 describes the initial creation of the testing management process described above with respect to FIG. 1. In one embodiment, method 200 is performed by application server 105 described with respect to FIG. 1.

Method 200 begins at block 210 where all tools and services used to test a software application are identified. In one embodiment, these tools and service may include continuous integration (CI) tools, test reporting tools, graphical designing tools, and resource management tools. In one embodiment, a configuration file may exist that specifies which tools and services to use and the server to find them on. If such a configuration file does not exist or the feature of configuration is not even implemented, embodiments of the invention may have the given tools and services hard-coded. The identification of the actual tools and services used depends on the particular business needs of the end user utilizing embodiments of the invention. This end user may pick the tools and services most suited for their needs after conducted research on the market of software application testing tools.

Then, at block 220, an order of execution of the identified tools and services to perform the test on the software application is determined. In some embodiments, the order of execution is determined by the pre-existing process that is in place in the environment and utilized by the identified tools and services. This pre-existing process may have been previously analyzed and converted to machine-readable form to be specified by the business process. In some embodiments, the order of execution may be designed so that job A must precede job B or that jobs C and D must not run in parallel. In such a case, embodiments of the invention ensure that these preconditions are fulfilled. However, in other embodiments, such preconditions are not defined and every job may be executed and run in parallel.

Subsequently, at block 230, tools of a BPM service are utilized to design a controlling testing management process to integrate the identified tools and services in the determined order of execution. In one embodiment, the BPM service uses its tools to automatically create the testing management process in a manner that defines the order of execution of the programming code of the various tools and services used for testing applications. The testing management process provides a set of rules for the various tools and services that dictates what happens and when it happens during the process. The process of embodiments of the invention provides the individual jobs performed by the tools and services for testing applications with various instructions, parameters, and resources defining the execution environment for these jobs. As a result, the integrated tools and service can be used together for testing the application in an automated and unattended manner.

Lastly, at block 240, the testing management process designed in block 230 is deployed on an application server for use in testing the application. Once deployed, the testing management process operates as a controlling layer over the identified tools and services to perform the testing on the application without requiring human interaction.

Figure 3:
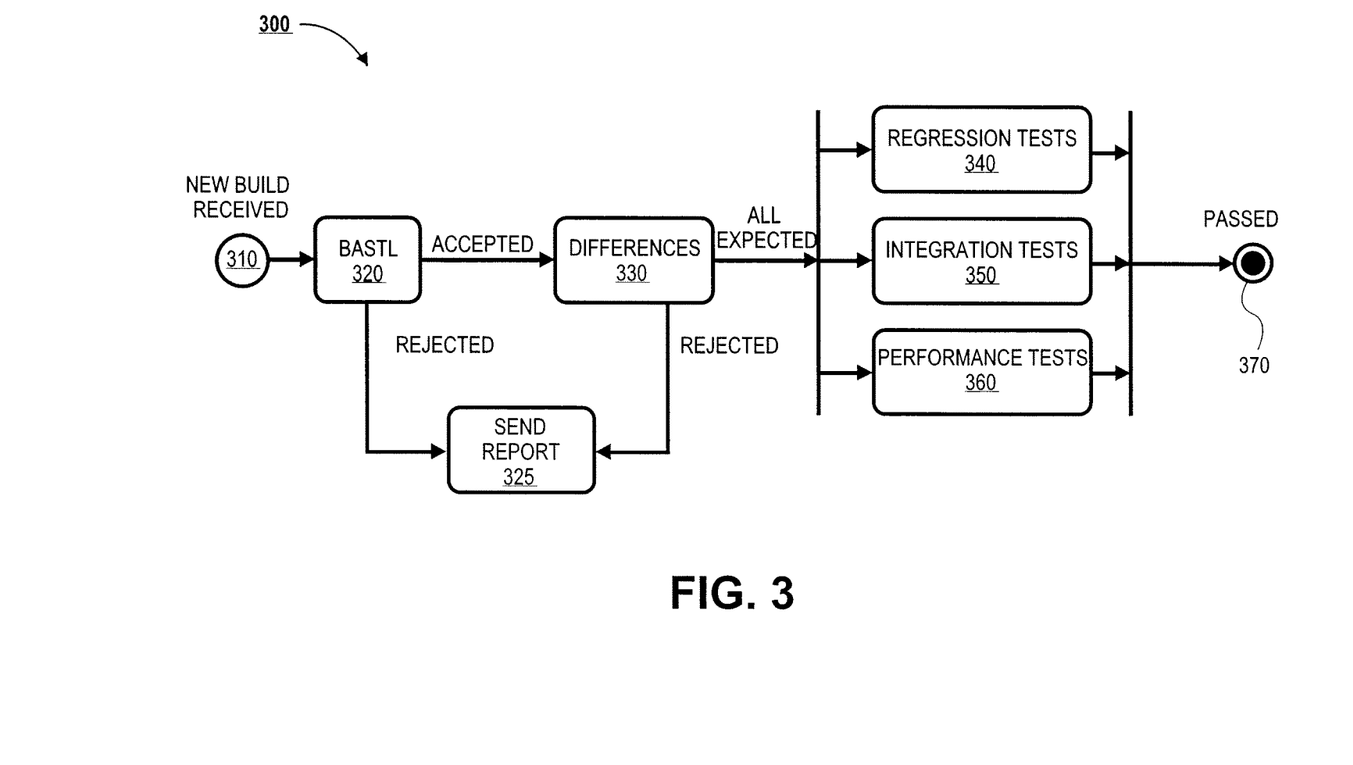
FIG. 3 is a flow diagram illustrating a method for a parent process of automated and unattended testing management according to an embodiment of the invention.

FIG. 3 is a flow diagram illustrating a method 300 for a parent process of automated and unattended testing management according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by testing management module 165 of application server 105 described with respect to FIG. 1.

Method 300 provides an automated and unattended process built via BPM rules to handle dependencies between children processes associated with software application testing. This automated and unattended process is capable of executing some of its child processes before or after other child processes. In one embodiment, the process provided by method 300 can even execute many of the child processes that are not inter-dependent in parallel, resulting in lessened overall time to test the software application.

Method 300 begins at block 310 where a new build of a software application product is provided. The particular application build is a compiled product prepared for release and may also be known as a release candidate. In one embodiment, the build has to be accepted for testing before it can actually have the tests run on it. The accept/reject sub-process is performed at block 320. In one embodiment, an internal automated Build Acceptance Smoke Test Launcher (BASTL) tool is used to perform the accept/reject process of block 320.

If the accept/rejection subprocess results in a rejection of the provided application build, a report is sent at block 325 indicating the reasons for the rejection. In one embodiment, the rejection result may be reported via email or via any reporting tool using an application programming interface (API). If the application build is rejected at block 320, method 300 ends at this point because any issues with the application build should be fixed and a new build created for testing.

If the application build is accepted for testing at block 320, a differences sub-process is performed at block 330. The differences subprocess finds any differences between the present application build and any previous application builds to determine if there are any unexpected changes between the builds. If unexpected changes are discovered, the application build is rejected and a result report sent out at block 325.

If no unexpected changes are found at block 320, then the testing of the application build itself may begin. The application build is provided to testing tools, such as a CI tool, to perform the actual testing. As part of the application build, samples of the application are provided that show individual features of the application product and how to use those feature. These samples, sometimes known as "quickstarts"

(QS), typically are provided by developers and come bundled with the product that is being tested.

The samples can be used quickly by the testing tools as a skeleton to emulate the real production-based application. In some embodiments, the samples are converted to tests. In other embodiments, the samples may be created on-the-fly for features that the developers have not written any samples for yet.

Embodiments of the invention test the application build against several platforms (e.g., Linux, Windows, Solaris, HP-UX), databases (e.g., Oracle, PostgreSQL, MySQL, MSSQL, etc.), JAVA Development Kits (JDKs), and processor architectures. In one embodiment, the platforms which the application build is tested against are chosen first. Then, for each platform, criteria (e.g., DBs, JDKs) are configured for the selected platform. As a result, several configurations of the application build for testing are created.

Embodiments of the invention perform testing of each configuration via three test groups. These test groups are integration tests, regression tests, and performance tests. The first group of tests is the regression tests at block 340. Regressions tests are created from the provided application samples (at least one for every sample). In some embodiments, the testing for bugs in the application may also be part of the regression group tests.

The second group of tests to be run is the integration tests at block 350. This group of tests provides for testing the integration of other projects related to the application into the present application product. In one embodiment, other such projects may include the integration of web services with a particular application, the integration of a rules engine with the application, or the integration of BPM tools with the application. These are some examples of projects that may be integrated with an application, and embodiments of the invention also envision a variety of other possible projects that can be tested for integration into an application.

The third group of tests to be run is the performance tests at block 360. The performance tests are used to measure performance of individual product features of the provided application build. In one embodiment, performance tests are also used to compare the present version of the software with a previous version. When all the test groups from blocks 340 through 360 are finished and have passed, the application build is passed and is ready for release at block 370.

Figure 4:
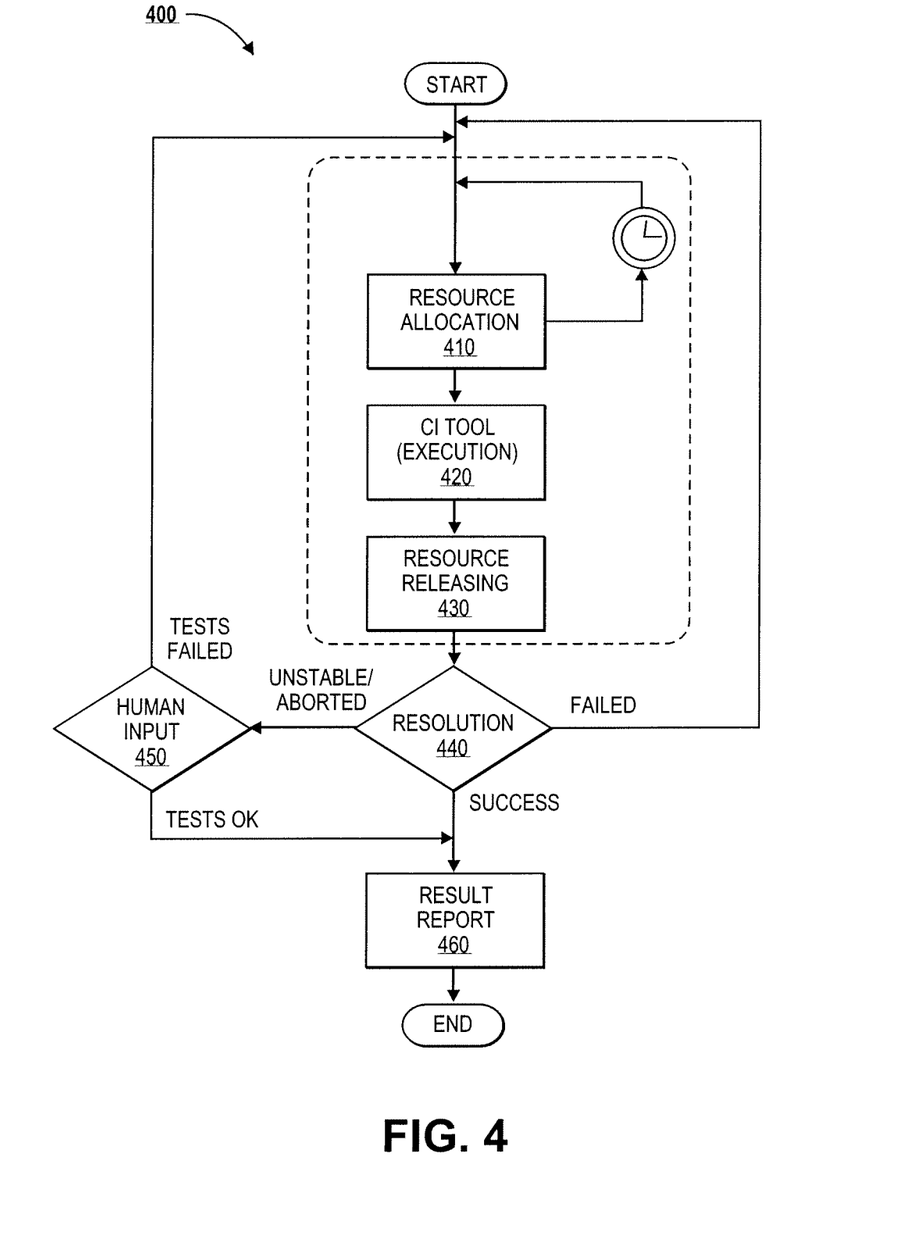
FIG. 4 is a flow diagram illustrating a method for performing a job as part of an automated and unattended process for testing software applications according to an embodiment of the invention.

FIG. 4 is a flow diagram illustrating a method 400 for performing an individual job as part of an automated and unattended process for testing software applications according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 represents a more-detailed view of a single test performed by any one of the testing groups in blocks 340, 350, or 360 described with respect to FIG. 3. In one embodiment, method 400 is performed by testing management module 165 of application server 105 described with respect to FIG. 1.

In one embodiment, method 400 may be performing any one of the following tests: a smoke test for accepting/rejecting a new build; a test to detect differences between a new and previous application build; integration tests to test for integration of other projects into the present application product build being tested (such as web services or jBPM); regression tests to test individual features of product (where the test is created from a sample of application build) for function; bug fix tests for fixing bugs; and performance tests to measure performance of a variety of application product features. However embodiments of the invention are not limited to the above examples and may include any kind of automated test that can be performed on a software application build.

Method 400 begins at block 410 where resources needed for the test are allocated. In one embodiment, the resources include database accounts, test machines, data storage, memory, other required machines for testing, and so on. In one embodiment, allocating these resources includes connecting to them and ensuring they are ready to execute. The needed resources are repeatedly allocated at block 410. If the resources are available, then the process continues. If the resources are not available, then method 400 automatically waits a predetermined period of time and tries again without requiring any human intervention. This cycle repeats until the resources are available and allocated for the test.

At block 420, parameters, such as information identifying the allocated resources from block 410, are then passed to an execution subprocess that handles all the interaction with the testing tool, such as a CI tool. The subprocess contacts the testing tool and tells it which test(s) need to be run using the parameters the testing tool is given. Then, at block 430, after the test is run by the testing tool, all of the allocated resources are de-allocated and released for use by other tests. In one embodiment, this includes disconnecting from a database resource, and so on.

At this point, a test result is available from running the test in blocks 420 through 430. In one embodiment, the test results may include failure, success, or unstable. This test result is forwarded for resolution at block 440. If, at block 440, it is determined that the test result indicates failure, the process 400 is automatically restarted. In one embodiment, a failure test result may indicate a hardware problem or that the test has been stopped, for example. On the other hand, if the result indicates success at block 440, it is forwarded to reporting at block 460.

Otherwise, if the test result is unstable at block 440, then control is forwarded to a human at block 450. A test result of unstable indicates that the test finished but with some minor issues, such as in the case of application builds that are aborted or contain small problems. The human interaction at block 450 decides whether to restart the process 400 or forward the test result to reporting as if it was a successful test. Human intelligence is needed at this point to ascertain whether the failure of the test was an expected or unexpected failure. If the test ran as expected and resulted in the failure, then the test does not need to be run again and the results can be reported at block 460. However, if the test did not run as expected and resulted in the failure, then a human may determine that the test should be run again.

Lastly, at block 460, a result report subprocess interacts with various external systems and reports the results of the test. In one embodiment, result reporting includes aggregating all test results into a test report and sending the report to a test management suite. In one embodiment, the test management suite may be Testopia™ or any other reporting tool. The result report subprocess may also send out other kinds of electronic notifications, such as e-mail. In addition, the result report subprocess may also provide an interface to review test results. This may be useful for a person to analyze testing progress and state of the tested application build. In one embodiment, the interface may be provided as a Web-based tool.

Figure 5:
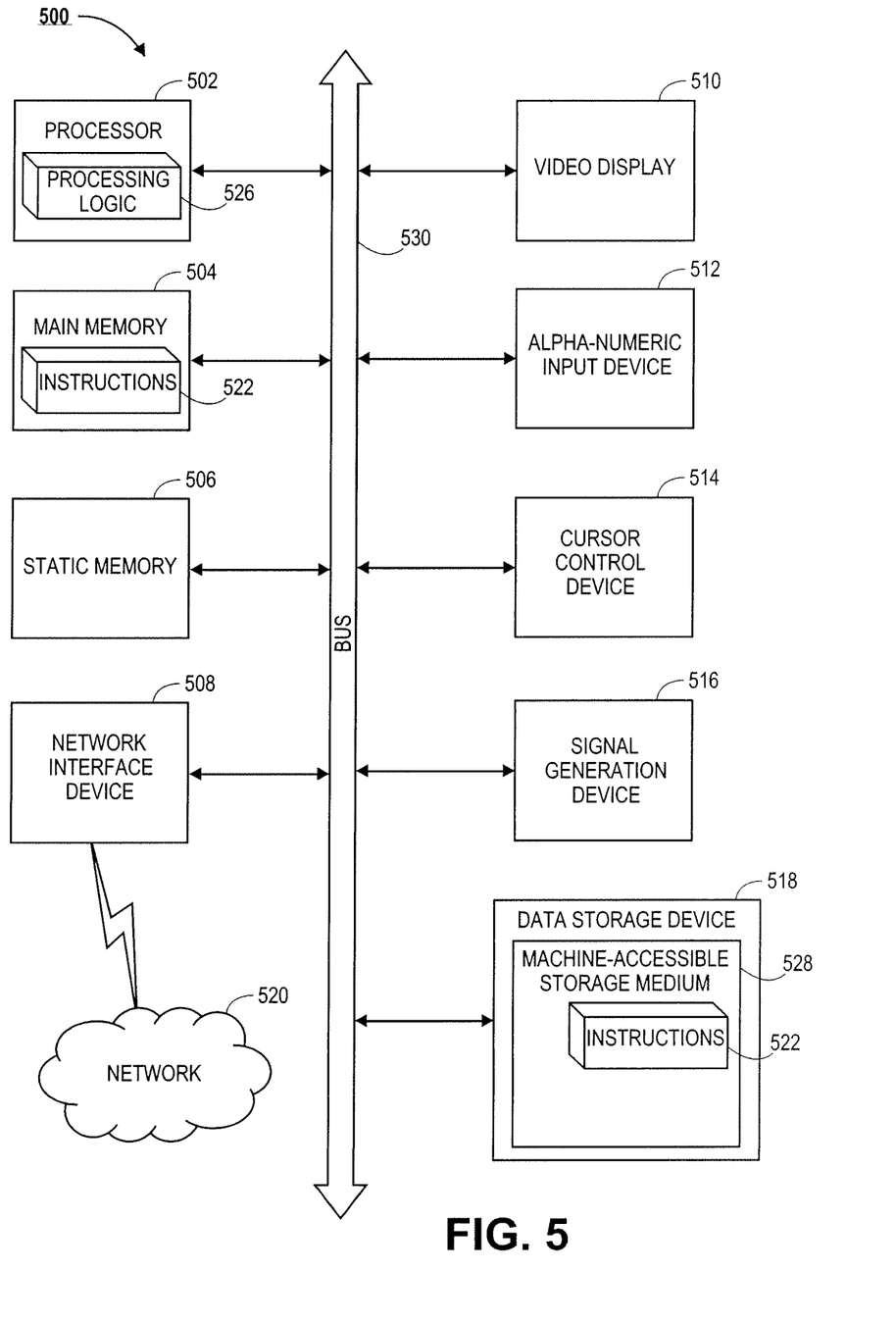
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform method 200 to provide an automated and unattended process for testing software applications as described with respect to FIG. 2, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising
identifying, by a server computing device, tools and services used to test a software application, wherein the tools and services comprise at least one of a continuous integration (CI) tool or a test reporting tool;
determining, by the server computing device, an order of execution of the identified tools and services in testing the software application;
designing, by a business process management (BPM) service of the server computing device, a testing management process that integrates the identified tools and services in the determined order of execution for testing the software application in an automated and unattended manner;
deploying, by the server computing device, the testing management process to act as a controlling layer over the identified tools and services in the testing of the software application;
allocating, by the server computing device, resources for the identified tools and services, wherein the resources comprise at least one of a database, a test machine, or a storage device, and wherein the allocating further comprises connecting to the resources and confirming the resources are ready to execute; and
providing, by the testing management process, instructions, parameters, and the allocated resources to programming code of the identified tools and services to enable the identified tools and services to perform the testing of the software application in the determined order of execution;
wherein the testing management process comprises a subprocess to control acceptance or rejection of a build of the software application being tested, a subprocess to determine differences of the build of the software application from any previous builds of the software application, and a subprocess to apply regression tests, integration tests, and performance tests to the build.

2. The method of claim 1, wherein the BPM service uses at least one of Java™ Business Process Management (jBPM) tools or JBoss™ Rules to design the testing management process.

3. The method of claim 1, wherein the subprocess to apply regression tests, integration tests, and performance tests further comprises a subprocess to allocate the resources to the tests, a subprocess to execute the tests, a process to de-allocate the allocated resources, a subprocess to resolve a result of the executed test, and a subprocess to control reporting the result of the executed test.

4. The method of claim 1, wherein the subprocess to apply regression tests, integration tests, and performance tests further comprises a subprocess to automatically restart any of the regression tests, the integration tests, and the performance tests if the result of the executed test is unstable.

5. A system, comprising:
a memory;
a processing device communicably coupled to the memory;
a business process management (BPM) service executable from the memory by the processing device, the BPM service to define a testing management process for a complete test of an application deployed on the system; and
a testing management module executable from the memory by the processing device, the testing management module to:
identify tools and services on the server computing device and on the application server used to test the application, the tools and services comprising a continuous integration (CI) tool provided by a server computing device communicably coupled to the system via a network;
determine an order of execution of the identified tools and services in testing the application;
utilize the BPM service to integrate the identified tools and services in the determined order of execution for testing the application in an automated and unattended manner;
deploy the testing management process to act as a controlling layer over the identified tools and services in the testing of the application;
allocate resources for the identified tools and services, wherein the resources comprises at least one of a database, a test machine, or a storage device, and wherein the allocating further comprises connecting to the resources and confirming the resources are ready to execute; and
provide, by the testing management process, instructions, parameters, and the allocated resources to programming code of the identified tools and services to enable the identified tools and services to perform the testing of the software application in the determined order of execution;
wherein the testing management process comprises a subprocess to control acceptance or rejection of a build of the software application being tested, a process determining differences of the build of the software application from any previous builds of the software application, and a subprocess to apply regression tests, integration tests, and performance tests to the build.

6. The system of claim 5, wherein the BPM service uses at least one of Java™ Business Process Management (jBPM) tools or JBoss198 Rules to design the testing management process.

7. The system of claim 5, wherein the subprocess to apply regression tests, integration tests, and performance tests further comprises a subprocess to allocate the resources to the tests, a subprocess to execute the tests, a process to de-allocate the allocated resources, a subprocess to resolve a result of the executed test, and a subprocess to control reporting the result of the executed test.

8. The system of claim 5, wherein the subprocess to apply regression tests, integration tests, and performance tests further comprises a subprocess to automatically restart any of the regression tests, the integration tests, and the performance tests if the result of the executed test is unstable.

9. The system of claim 5, wherein the BPM service uses at least one of Java™ Business Process Management (jBPM) tools or JBoss™ Rules to design the testing management process.

10. A non-transitory machine-readable storage medium including instructions that, when accessed by a server computing machine, cause the server computing device to perform operations comprising:
identifying, by the server computing device, tools and services used to test a software application, wherein the tools and services comprise at least one of a continuous integration (CI) tool or a test reporting tool;
determining, by the server computing device, an order of execution of the identified tools and services in testing the software application;
designing, by a business process management (BPM) service of the server computing device, a testing management process that integrates the identified tools and services in the determined order of execution for testing the software application in an automated and unattended manner;
deploying, by the server computing device, the testing management process on the server computing device to act as a controlling layer over the identified tools and services in the testing of the software application;
allocating, by the server computing device, resources for the identified tools and services, wherein the resources comprise at least one of a database, a test machine, or a storage device, and wherein the allocating further comprises connecting to the resources and confirming the resources are ready to execute; and
providing, by the testing management process, instructions, parameters, and the allocated resources to programming code of the identified tools and services to enable the identified tools and services to perform the testing of the software application in the determined order of execution;
wherein the testing management process comprises a subprocess controlling acceptance or rejection of a build of the software application being tested, a process determining differences of the build of the software application from any previous builds of the software application, and a subprocess to apply regression tests, integration tests, and performance tests to the build.

11. The non-transitory machine-readable storage medium of claim 10, wherein the process to apply regression tests, integration tests, and performance tests further comprises a subprocess to allocate the resources to the tests, a subprocess to execute the tests, a subprocess to de-allocate the allocated resources, a subprocess to resolve a result of the executed test, and a subprocess to control reporting the result of the executed test.

12. The non-transitory machine-readable storage medium of claim 10, wherein the subprocess to apply regression tests, integration tests, and performance tests further comprises a subprocess to automatically restart any of the regression tests, the integration tests, and the performance tests if the result of the executed test is unstable.

* * * * *

UNITED STATES PATENT AND TRADEMARK OFFICE
CERTIFICATE OF CORRECTION

PATENT NO. : 8,739,125 B2  
APPLICATION NO. : 12/485527  
DATED : May 27, 2014  
INVENTOR(S) : Lukas Petrovicky and Pavel Macik Page 1 of 1

It is certified that error appears in the above-identified patent and that said Letters Patent is hereby corrected as shown below:

In the claims,

In claim 6, column 11, line 58, delete "JBoss198" and insert --JBoss™--

Signed and Sealed this  
Third Day of November, 2015

Michelle K. Lee  
*Director of the United States Patent and Trademark Office*